Nov. 11, 1930.                J. MICHELI                1,781,067
                                GOGGLES
                           Filed Jan. 19, 1929
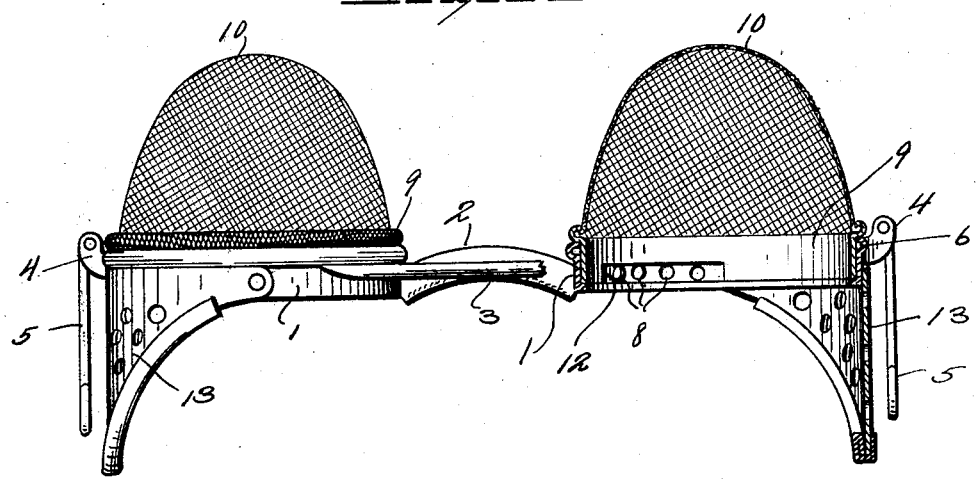
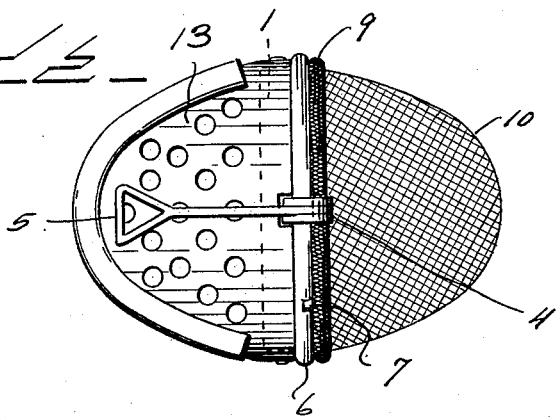
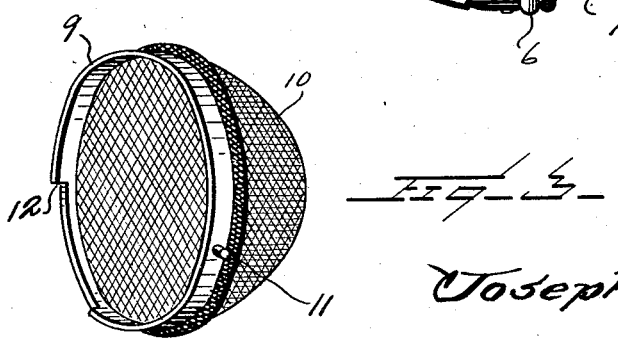
Inventor
Joseph Micheli
By Watson E. Coleman
Attorney Patented Nov. 11, 1930

1,781,067

UNITED STATES PATENT OFFICE

JOSEPH MICHELI, OF BERWIND, COLORADO

GOGGLES

Application filed January 19, 1929. Serial No. 333,632.

This invention relates to improvements in goggles, more particularly goggles designed for protecting the eyes of miners and others working under conditions similar to the conditions under which miners work, as for example, stone workers and quarry men.

While it is well known that various types of goggles which are at present worn by miners for the protection of the eyes, are provided in some instances with glass lenses and in other instances with gauze screens, it is also well known that while these goggles perform the functions for which they are designed with a certain degree of efficiency they have serious drawbacks. In connection with the use of goggles having glass lenses or visions the glasses become fogged due to the contact therewith of the cool moisture laden atmosphere of the mines, causing moisture to be congealed on the lenses which have been warmed as a result of their close proximity to the wearer's face and after this, of course, the dust of the mine gathers and is held on the lenses by the moisture. This necessitates frequent cessation of work on the part of the miner for the purpose of wiping off the glasses and in addition creates a dangerous condition for the miner to work under.

In the various types of gauze screened goggles that have been employed heretofore the gauze is fitted too close to the eye of the miner and his vision is therefore seriously impaired. If the gauze is too fine the visibility is cut down and substantially the same condition prevails with regards to the congealing of the moisture of the mine air upon the warmed screen as when glass lenses are used.

The primary object of the present invention is to overcome all of the difficulties set out in the foregoing paragraphs, first by providing gauze screens of substantially parabolic form and second by providing proper ventilation through the rims of the goggles. With screens of this type, gauze of considerably larger mesh than heretofore employed can be made use of; the mesh is positioned a sufficient distance from the eye to prevent any interference with full vision, the warmth from the face of the miner will not sufficiently affect the screen to cause the mine air moisture to congeal thereon and flying particles of coal upon striking the screen from any angle will be deflected without injuring the screen.

In addition to the foregoing a further object to provide a screen of the character described mounted upon a frame which is removably positioned in a rim of the goggles so that if the screen should become damaged it may be readily removed for replacement by a new one.

The invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view partly in plan and partly in section of the goggles embodying this invention;

Figure 2 is a view in side elevation of the same;

Figure 3 is a perspective view of one of the screens and carrying frame therefor.

Referring to the drawing in detail, each of the numerals 1 indicates a rim of the goggles, these rims being connected by the usual nose saddle 2 and by the brace bar 3 extending over the saddle 2.

Each of the rims has secured to its outer side a hinged member 4 to which a short temple bar 5 is pivotally attached, the bars 5 being designed to have connected thereto a suitable head strap (not shown) for holding the goggles in position before the wearer's face.

Each of the rims 1 is formed to provide adjacent its front edge and upon its inner face a surrounding groove 6 and at one point in the front edge of each rim is formed a notch or recess 7 which opens into the groove.

In addition, each of the rims at the lower inner side is provided with a plurality of ventilation apertures 8, the purpose of which will be more specifically hereinafter pointed out.

Detachably positioned in each of the rims is a wire screen frame 9 which carries a forwardly projecting screen 10 of substantially parabolic contour. Each of the screen frames carries a pin or lug which, when the frame is being placed in position in its holding rim is inserted into the slot 7 so that partial rotary movement of the frame will cause the pin to enter the rim groove 6 and thus lock the frame in position in the rim.

The free edge of the screen rim 9 is provided with a cut out portion 12 which, when the screen is in the proper position in a rim, overlies the ventilation apertures 8 thus permitting the free circulation of air through the rim adjacent the face of the wearer.

Secured adjacent the outer side of each of the rims is an apertured plate 13 which constitutes a temple shield, these plates being pivotally attached to their respective rims at the top and bottom of the rim so that when the goggles are not in use the temple shields may be folded in to facilitate the insertion of the goggles into a suitable carrying case or holder.

From the foregoing description it will be readily seen that in providing goggles of this character with eye shield screens of the parabolic configuration shown, the eyes of the wearer will not be affected by the screens as they will be positioned a sufficient distance in front of the eyes to prevent interference therewith and in addition to this the formation of the screens is such that strength is given thereto and any flying particles which may come into contact therewith will hit the same in such a manner as to be effectively deflected. In the event that the screens do become injured they may be readily removed by rotating until the locking pin 11 is brought in its groove 6 to the recess 7 after which the screen frame may be withdrawn from the holding rim to permit the insertion of a complete new screen.

Having thus described my invention, what I claim is:—

1. Goggles comprising a pair of rims each of substantial width and each having an air vent aperture formed therethrough, means for maintaining said rims in position before the eyes of a wearer, said rims each having a groove about the inner face and adjacent the forward edge thereof and a notch opening from the forward edge into said groove, a frame insertable into each rim from the front, a pin carried by each frame adapted to pass through said notch into the holding rim groove, and a substantially parabolic foraminous screen carried by and extending forwardly of each frame, each of said screen carrying frames having an opening formed therethrough conforming to the aperture in the adjacent rim and aligning therewith when the frame is rotated to a predetermined position, to permit the ventilating of the interior of the screen.

2. Goggles comprising a pair of rims each of substantial width and each having an air vent aperture formed therethrough, means for maintaining said rims in position before the eyes of a wearer, said rims each having a groove about the inner face and adjacent the forward edge thereof and a notch opening from the forward edge into said groove, a frame insertable into each rim from the front, a pin carried by each frame adapted to pass through said notch into the holding rim groove, and a substantially parabolic foraminous screen carried by and extending forwardly of each frame, each of said screen carrying frames having an opening formed therethrough conforming to the aperture in the adjacent rim and aligning therewith when the frame is rotated to a predetermined position, to permit the ventilating of the interior of the screen, said screen carrying frames being relatively wide and each having a bead formed thereabout adjacent the point of connection therewith of the screen contacting with the forward edge of the receiving rim.

JOSEPH MICHELI.